(No Model.)

G. W. WARNER.
ANTI-FRICTION ROLLER AND WHEEL.

No. 348,802. Patented Sept. 7, 1886.

WITNESSES
C. H. Durand
Edward Stanton

INVENTOR
G. Wilber Warner
By Louis Bagger & Co.
Attorney

UNITED STATES PATENT OFFICE.

G. WILBER WARNER, OF FREEPORT, ILLINOIS.

ANTI-FRICTION ROLLER AND WHEEL.

SPECIFICATION forming part of Letters Patent No. 348,802, dated September 7, 1886.

Application filed March 2, 1886. Serial No. 193,745. (No model.)

*To all whom it may concern:*

Be it known that I, G. WILBER WARNER, a citizen of the United States, and a resident of Freeport, in the county of Stephenson and State of Illinois, have invented certain new and useful Improvements in Anti-Friction Rollers and Wheels; and I do hereby declare that the following is a full, clear, and exact description thereof, which will enable others skilled in the art to which it appertains to make and use the same, reference being had to the accompanying drawings, which form a part of this specification, and in which—

Figure 1:
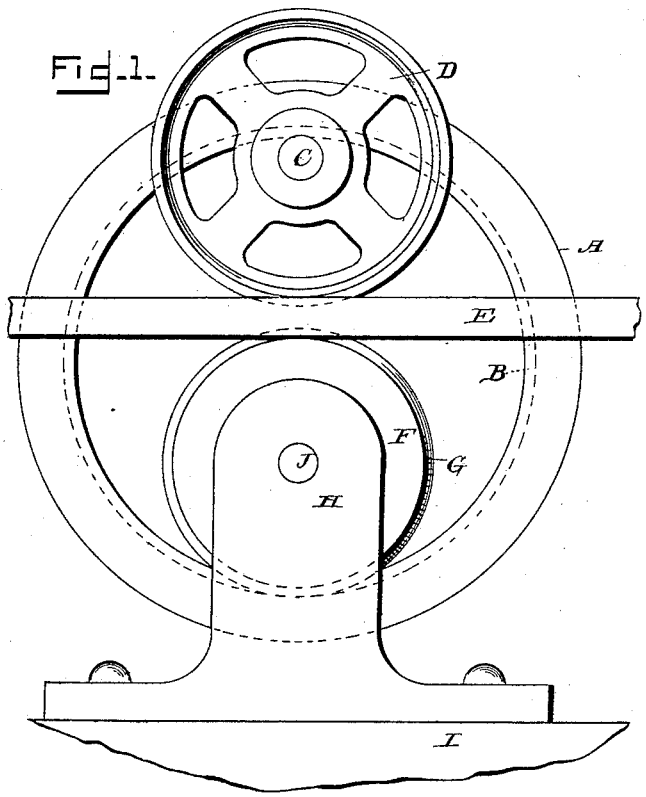
Figure 2:
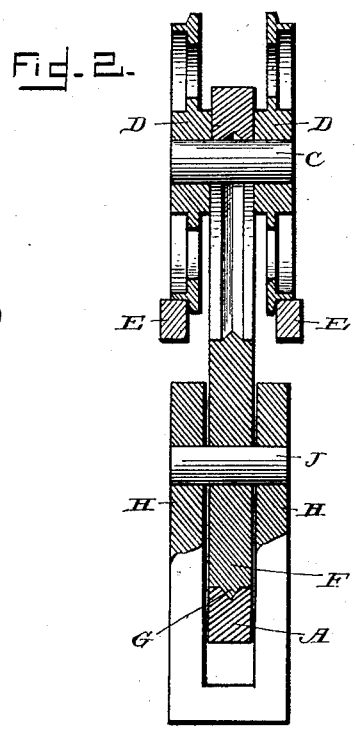
Figure 3:
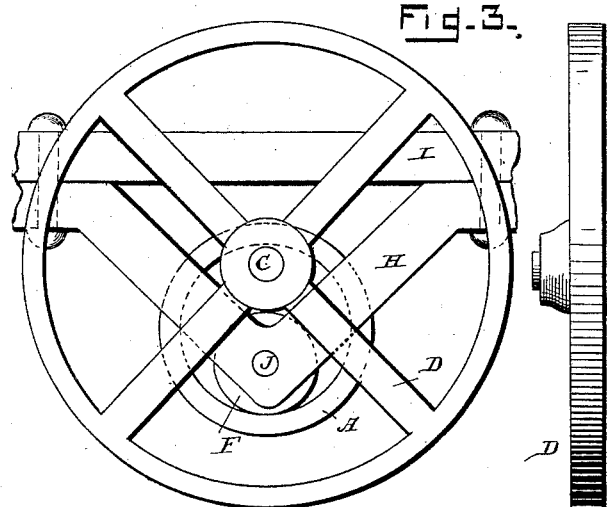
Figure 4:
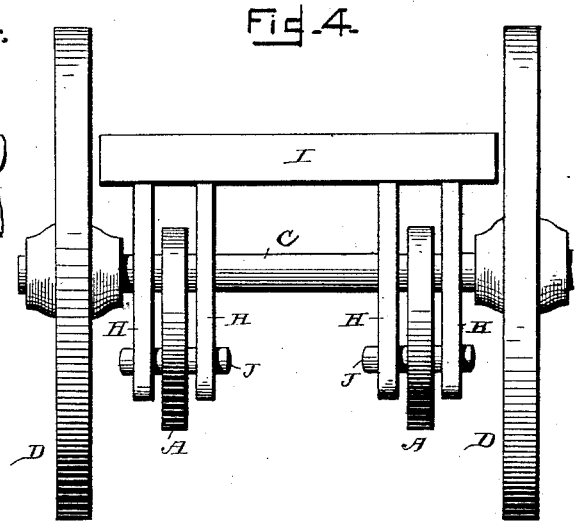

Figure 1 is a side view of a door-hanger provided with my improved anti-friction device. Fig. 2 is a vertical axial sectional view of the same. Fig. 3 is a side view showing the device applied to a truck or similar vehicle, and Fig. 4 is an end view of the same.

Similar letters of reference indicate corresponding parts in all the figures.

My invention has relation to anti-friction devices for hanging rollers or wheels; and it consists in the improved construction and combination of parts of such a device especially adapted for door-hangers, although applicable for other uses, as hereinafter more fully described and claimed.

In the accompanying drawings, the letter A indicates a ring having a triangular groove, B, in its inner flat side. The shaft C, to the ends of which the rollers or wheels D D are secured, bears against the upper portion of the inner side of ring A, the hubs bearing against the sides of the ring, and these rollers and wheels travel upon the rails E E, from which the door is supported. A disk, F, having a V-shaped rib, G, upon its periphery fitting in the groove in the inner side of the ring, travels in the lower portion of the ring, having the rib and the groove guiding it, and two lips, H H, projecting upward from the upper edge of the door I, have the ends of the shaft J of this disk journaled in their upper ends. It will be seen that as the door is moved to one side or the other, the upper wheels or rollers will travel a considerable distance, turning the ring with their axle or shaft, and the ring will again turn the disk, which will make comparatively few revolutions, while the rollers make a great number, so that all the parts have rolling bearings, and consequently slight frictional resistance, with the exception of the disk, which will revolve comparatively few times, and for which the frictional resistance of the shaft in its bearings will be comparatively small.

When the device is to be used in a truck or similar vehicle, the wheels or rollers are made of a considerably greater proportional diameter than the wheels for a door-hanger, so that they may project below the bottom I of the truck, and below the ring and disk, and the disk has its shaft journaled in bearings, which project downward from the bottom instead of projecting upward, as the lips of the door.

The operation of the device is the same in both cases, and the device may be used with other changes, which will adapt it to different purposes and uses, where it is desirable to reduce the frictional resistance for the axles or shafts of wheels or rollers as much as possible. The rollers in the door-hanger, which travel upon the rails, are preferably formed with flanges bearing against the inner edges of the rails, and the disk within the lower portion of the ring is preferably provided with the guide-rib fitting in the groove; but the rib and groove may be omitted without departing from the spirit of my improvement.

Having thus described my invention, I claim and desire to secure by Letters Patent of the United States—

1. The combination of the wheels and axle of a truck, internally-grooved rings encircling and hanging from said axle, and disks formed with central peripheral ribs journaled in bearings hanging from the wagon-bottom, said disks being adapted to roll in the lower portion of said rings, substantially as described and set forth.

2. In an anti-friction device, the combination of a ring of circular shape and having a groove in its inner side, a pair of rollers or wheels for traveling upon the support secured upon both ends of an axle bearing against the inner side of the upper portion of the ring and having the inner ends of their hubs bearing against the sides of the ring, and a disk having a rib upon its periphery fitting in the groove of the ring and traveling within the lower portion of the ring, having the article or object to be moved supported to the ends of its shaft, as and for the purpose shown and set forth.

In testimony that I claim the foregoing as my own I have hereunto affixed my signature in presence of two witnessess.

G. WILBER WARNER.

Witnesses:
LEONARD STOSKOPF,
MICHAEL STOSKOPF.